United States Patent [19]

Dawe et al.

[11] Patent Number: 6,097,355

[45] Date of Patent: Aug. 1, 2000

[54] PURITY/BEAM LANDING ERROR MEASUREMENT METHOD FOR ELECTRONIC DISPLAY DEVICES

[75] Inventors: Wayne G. Dawe, Richmond Hill; Karoly G. Nemeth, Don Mills, both of Canada

[73] Assignee: Image Processing Systems, Inc., Scarborough, Canada

[21] Appl. No.: 08/971,947

[22] Filed: Nov. 17, 1997

[51] Int. Cl.[7] .................................................. H04N 5/12
[52] U.S. Cl. .............................. 345/10; 345/13; 345/14; 315/8; 315/370
[58] Field of Search ................................ 345/13, 14, 10; 315/8, 370, 368.1; 348/806

[56] References Cited

U.S. PATENT DOCUMENTS

| | | | |
|---|---|---|---|
| 3,723,801 | 3/1973 | Osenham | 315/11.5 |
| 3,962,722 | 6/1976 | Ciciora | 348/190 |
| 3,975,766 | 8/1976 | Sano et al. | 348/191 |
| 4,001,877 | 1/1977 | Simpson | 348/191 |
| 4,035,834 | 7/1977 | Drury | 348/191 |
| 4,330,779 | 5/1982 | Wilensky et al. | 345/7 |
| 4,415,921 | 11/1983 | Mulvanny et al. | 348/191 |
| 4,575,753 | 3/1986 | Mistry et al. | 380/220 |
| 4,602,272 | 7/1986 | Duschl | 348/191 |
| 4,635,095 | 1/1987 | Legrand et al. | 348/191 |
| 4,688,079 | 8/1987 | Fendley | 257/202 |
| 4,751,570 | 6/1988 | Robinson | 348/47 |
| 4,754,329 | 6/1988 | Lindsay et al. | 347/189 |
| 4,760,444 | 7/1988 | Nielson et la. | 348/129 |
| 4,814,858 | 3/1989 | Mochizuki et al. . | |
| 4,893,925 | 1/1990 | Sweeny et al. | 356/72 |
| 4,925,420 | 5/1990 | Fourche et al. | 445/3 |
| 5,032,769 | 7/1991 | Kawakami | 315/368.11 |
| 5,049,791 | 9/1991 | Kawakami | 315/368.11 |

(List continued on next page.)

FOREIGN PATENT DOCUMENTS

| | | |
|---|---|---|
| 01120767A1 | 10/1984 | European Pat. Off. . |
| 404700 | 12/1990 | European Pat. Off. . |
| 2255700 | 11/1992 | United Kingdom . |
| WO92/08868 | 5/1992 | WIPO . |
| WO95/34906 | 12/1995 | WIPO . |

OTHER PUBLICATIONS

Kim, S. R. et al., "Design and Implementation of an Automatic Adjustment System for Integrated Tube Components", *Mechatronics*, vol. 4., No. 1, pp. 1–23, Oxford; Great Britian.

(List continued on next page.)

*Primary Examiner*—William A. Cuchlinski, Jr.
*Assistant Examiner*—Marthe Y. Marc-Coleman
*Attorney, Agent, or Firm*—Connolly Bove Lodge & Hutz, LLP

[57] ABSTRACT

A method of calculating beam landing errors in an electronic display device having color phosphor elements and electron guns to generate electron beams to impinge on corresponding phosphor elements require a magnetic field to be generated to deflect an electron beam relative to the corresponding phosphor element on which the electron beam is to impinge. The intensity of light emitted by the phosphor elements in the measurement area is measured as the electron beam impinges thereon. The polarity of the magnetic field is reversed and the above step is repeated. Thereafter, the magnitude of the magnetic field is changed and the above two steps are repeated thereby to measure at least two different light intensities resulting from electron beam influenced by each polarity magnetic field. The at least two different light intensities resulting from electron beams influenced by each polarity magnetic field are then approximated with straight lines and an intersection point of the straight lines is determined. A corresponding magnetic field to the intersection point is also determined. A magnetic field is then generated corresponding to the intersection point and the intensity of light emitted by the phosphor element as the electron beam impinges thereon is measured. A beam landing error is then calculated using a characteristic of the phosphor element and at least some of the measured light intensities and corresponding generated magnetic fields.

28 Claims, 3 Drawing Sheets

U.S. PATENT DOCUMENTS

| | | | |
|---|---|---|---|
| 5,216,504 | 6/1993 | Webb et al. | 348/190 |
| 5,260,627 | 11/1993 | Yokota et al. | 315/400 |
| 5,339,010 | 8/1994 | Urata et al. | 315/368.17 |
| 5,371,537 | 12/1994 | Bohan et al. | 348/181 |
| 5,404,164 | 4/1995 | Hassler et al. | 348/182 |
| 5,557,297 | 9/1996 | Sharp et al. | 345/136 |
| 5,583,401 | 12/1996 | Inoue et al. | 315/370 |
| 5,642,175 | 6/1997 | Hirakawa | 348/191 |
| 5,969,756 | 10/1999 | Buckley et al. | 348/190 |

OTHER PUBLICATIONS

Lin, Robert, Jr., "Automated CRT inspection and Alignment", *Information Display,* vol. 4, No. 6, 8, pp. 16–17.

Hibara, T., et al. "Automatic Adjustment for Color Display Monitor" Proceedings of 1986 International Conference on Industrial Electronics, Control & Instrumentation IECON), Milwaukee WI, pp. 164–169.

Minolta CRT Focus Meter CB–150 brochure (updated).

WWW.Minolta.com web site regarding Minolta CRT Focus Meter.

PURITY/BEAM LANDING ERROR MEASUREMENT METHOD FOR ELECTRONIC DISPLAY DEVICES

FIELD OF THE INVENTION

The present invention relates to testing systems and in particular to a method and system for measuring beam landing errors within an electronic display device.

BACKGROUND OF THE INVENTION

During the manufacture and assembly of electronic display devices such as for example cathode ray (CRT) assemblies for complex monitors and television sets, precise mechanical, magnetic and electronic adjustments are required to ensure the electronic display devices provide optimum reproduction image quality. These adjustments include, but are not limited to, focus, purity of color, convergence of beams, color uniformity, geometry and luminance.

Purity of color or beam landing errors are a result of misalignment between the electron beams generated by the electronic display device and the phosphor elements thereof. Ideally, the electron beams are coincident with the phosphor elements so that the phosphor elements emit light at maximum intensity. Unfortunately, it is common during manufacture of the electronic display devices for the electron beams generated by the electronic display devices to be misaligned with the phosphor elements on which the electron beams are to impinge. Therefore, during the testing and alignment of electronic display devices, it is necessary to measure beam landing errors so that measures can be taken to correct them.

Test and alignment systems to test and adjust electronic display devices are known, such as for example those described in U.S. patent applications Ser. Nos. 08/750,522 and 08/670,694, assigned to the assignee of the present invention. These test and alignment systems include at least one wobulator generating magnetic fields to deflect electron beams within electronic display devices to allow beam landing errors to be measured. Many techniques have been considered to measure electron beam landing errors using a wobulator.

For example, U.S. Pat. No. 4,814,858 to Mochizuki et al., discloses a method for measuring beam landing errors using symmetrical, constant amplitude wobulation to move electron beams within the electronic display device. As the electron beams are moved, highly magnified images of illuminated and non-illuminated phosphor elements are taken and approximated with ellipses and circles in order to calculate beam landing errors. Unfortunately, this method is only suitable for measuring electron beam landing errors in electronic display devices having dot-type phosphor patterns and requires microscopic images of the illuminated phosphor elements to be examined.

In the article entitled "Design and Implementation of an Automatic Adjustment System for Integrated Tube Components" authored by S. R. Kim et al. and published in Mechatronics 1994, a method similar to the above-described technique is disclosed. However, this technique is adapted for electronic display devices in the form of color picture tubes including striped phosphor patterns and a shadow mask having elongate vertical openings with rounded rods therein. In this method, the detailed shapes of the top and bottom of greatly magnified illuminated phosphor elements are analyzed and conclusions of electron beam landing errors are made based on the asymmetricity of the analyzed shapes. Unfortunately, this method is also only suitable for a specific class of color picture tubes and requires microscopic images of the illuminated phosphor elements to be examined. Also, it is necessary to average several microscopic images due to the lack of uniformity of features of the illuminated phosphor elements.

U.S. Pat. No. 4,688,079 to Fendly discloses a method wherein a wobulator is used to deflect electron beams to adjacent different color phosphor elements. Knowing the periodicity and dimension of the phosphor element pattern and the current required to push the electron beams to adjacent phosphor elements and by measuring the current required to center the electron beams on their own phosphor elements, an equation can be determined to calculate electron beam landing errors based on the intensity of the illuminated phosphor elements. Unfortunately, this method requires large magnetic fields to deflect the electron beams to adjacent phosphor elements. Also, this method uses as reference the phosphor element pitch which often varies over the dimension of the electronic display device. Also, due to lack of uniformity between phosphor element features, averaging is required. Accordingly, an improved method of measuring beam landing errors within an electronic display device is desired.

It is therefore an object of the present invention to provide a novel method system for measuring beam landing errors within an electronic display device.

SUMMARY OF THE INVENTION

According to one aspect of the present invention there is provided a method of calculating beam landing errors in an electronic display device having color phosphor elements, and electron guns to generate electron beams to impinge on corresponding phosphor elements, said method comprising the steps of:

(i) generating a magnetic field to deflect an electron beam relative to the corresponding phosphor element on which said electron beam is to impinge and measuring the intensity of the light emitted by said phosphor element as said electron beam impinges thereon;

(ii) reversing the polarity of said magnetic field and repeating step (i);

(iii) changing the magnitude of the magnetic field and repeating steps (i) and (ii) thereby to measure at least two different light intensities influenced by each polarity magnetic field;

(iv) approximating each of said at least two different light intensities with a straight line and determining an intersection point of said straight lines and a magnetic field corresponding to said intersection point;

(v) generating said magnetic field corresponding to said intersection point and measuring the intensity of light emitted by said phosphor element as said electron beam impinges thereon; and (vi) calculating a beam landing error using a characteristic of said phosphor element and at least some of said measured light intensities and corresponding generated magnetic fields.

In one embodiment, the characteristic is a dimension of the phosphor element. It is also preferred that the beam landing error is calculated using the formula:

$$BeamLandingError = \frac{(dI1' + dI2')/2}{(dW1 + dW2)/2} * W6 * PW$$

where:
dI1 and dI2 are differences between mechanical intensities measured at step (i);
dW1 and dW2 are differences between the magnetic fields corresponding to the intensities measured at step (ii);
W6 is the magnetic field corresponding to the intersection point of the straight lines; and
PW is the dimension of the phosphor element in the dimension of deflection of the electron beam.

In one embodiment, the straight lines are determined using a straight line approximation. In another embodiment three or more light intensity measurements are taken resulting from electron beams influenced by each polarity magnetic field. In this case, the measured intensities are approximated using a higher order function and straight lines are determined from the high order function. In a preferred embodiment, the higher order function is a hyperbola and the straight lines are determined by the asymptote thereof.

According to another aspect of the present invention there is provided a method of calculating beam landing errors in a color picture tube having a phosphor screen including a plurality of spaced, red, green and blue phosphor stripes, electron guns to generate red, green and blue electron beams to impinge on corresponding phosphor stripes and a shadow mask interposed between said electron guns and said phosphor screen, said method comprising the steps of:

(i) generating a magnetic field to deflect an electron beam relative to the corresponding phosphor stripe on which said electron beam is to impinge and measuring the intensity of the light emitted by said phosphor stripe as said electron beam impinges thereon;

(ii) reversing the polarity of said magnetic field and repeating step (i);

(iii) changing the magnitude of the magnetic field and repeating steps (i) and (ii) thereby to measure at least two different light intensities influenced by each polarity magnetic field;

(iv) approximating each of said at least two different light intensities with a straight line and determining an intersection point of said straight lines and a magnetic field corresponding to said intersection point;

(v) generating said magnetic field corresponding to said intersection point and measuring the intensity of light emitted by said phosphor stripe as said electron beam impinges thereon; and (vi) calculating a beam landing error using the width of said phosphor stripe and at least some of said measured light intensities and corresponding generated magnetic fields.

According to still yet another aspect of the present invention there is provided a method of calculating beam landing errors in a color display tube having a phosphor screen including a matrix of red, green and blue phosphor dots, electron guns to generate red, green and blue electron beams to impinge on corresponding phosphor dots, said method comprising the steps of:

(i) generating a magnetic field to deflect the electron beam relative to the corresponding phosphor dot on which said electron beam is to impinge in one of a horizontal and vertical direction and measuring the intensity of the light emitted by said phosphor dot as said electron beam impinges thereon;

(ii) reversing the polarity of said magnetic field and repeating step (i);

(iii) changing the magnitude of the magnetic field and repeating steps (i) and (ii) thereby to measure at least two different light intensities influenced by each polarity magnetic field;

(iv) approximating each of said at least two different light intensities with a straight line and determining an intersection point of said straight lines and a magnetic field corresponding to said intersection point;

(v) maintaining the magnetic field determined at step (iv) and repeating steps (i) to (iv) with said electron beam being deflected in the other of the horizontal and vertical direction;

(vi) generating said magnetic field corresponding to said intersection point with said magnetic field being maintained and measuring the intensity of light emitted by said phosphor dot as said electron beam impinges thereon;

(vii) calculating a beam landing error for said other of the horizontal and vertical direction using a dimension of said phosphor dot and at least some of said measured light intensities and corresponding generated magnetic fields; and (viii) repeating steps (v) to (vii) with the magnetic field being maintained as determined at step (v) thereby to calculate the beam landing error for said one of the horizontal and vertical direction.

In still yet another aspect of the present invention there is provided a system for calculating beam landing errors in an electronic display device having color phosphor elements, and electron guns to generate electron beams to impinge on corresponding phosphor elements, said system comprising:

a magnetic field generator to generate magnetic fields of alternating polarity and of predetermined different magnitudes to deflect an electron beam relative to the corresponding phosphor element on which said electron beam is to impinge;

light sensing means to measure the intensity of the light emitted by said phosphor element as said electron beam impinges thereon under the influence of said magnetic fields thereby to measure at least two different light intensities influenced by each polarity magnetic field; and a processor to approximate each of said at least two different light intensities with a straight line and determine an intersection point of said straight lines and a magnetic field corresponding to said intersection point, said processor further calculating a beam landing error using a characteristic of said phosphor element, at least some of said measured light intensities and corresponding generated magnetic fields, the magnetic field corresponding to said intersection point and the intensity of light emitted by said phosphor element as said electron beam impinges thereon influenced by the magnetic field corresponding to said intersection point.

The present invention provides advantages in that beam landing measurements can be made without requiring microscopic images of the illuminated phosphor elements to be examined and without requiring large magnetic fields to be generated during wobulation.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
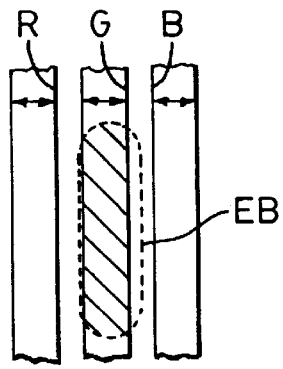
FIG. 1 is an illustration of a portion of a phosphor screen within a color picture tube showing an electron beam impinging on a green phosphor stripe without being influenced by a magnetic field.

Referring now to FIG. 1, portions of red, green and blue phosphor stripes R, G and B respectively forming part of the phosphor screen within an electronic display device in the form of a color picture tube are shown. As is well known in conventional color picture tubes, the phosphor screen is positioned on the inside surface of the front panel of the color picture tube. A shadow mask having a plurality of elongate vertical slots is positioned between the phosphor screen and the electron guns of the electronic display device. The electron beam pertaining to each red, green and blue phosphor stripe is deflected vertically and horizontally to scan progressively the entire screen during a vertical scan time period.

Ideally, when the electron guns generate electron beams, the electron beams pass through the shadow mask and impinge directly on the corresponding phosphor stripes resulting in maximum intensity light being emitted by the phosphor stripes. Unfortunately, due to misalignment of the electron guns or variations in the magnetic characteristics of the deflection yoke as well as mechanical assembly errors, electron beams often fail to land correctly on the phosphor stripes. In the example shown in FIG. 1, a single electron beam EB misaligned (i.e. not symmetrical) with the green phosphor stripe G on which it impinges is illustrated.

Figure 2:
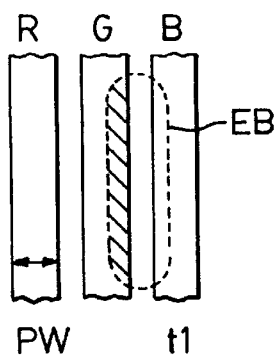
FIG. 2 are illustrations of the electron beam of FIG. 1 at time intervals t1 to t6 undergoing the influence of different polarity and magnitude magnetic fields.
Figure 2:
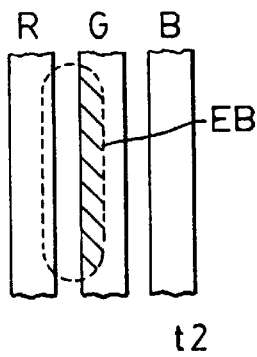
Figure 2:
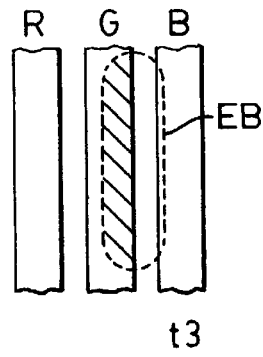
Figure 2:
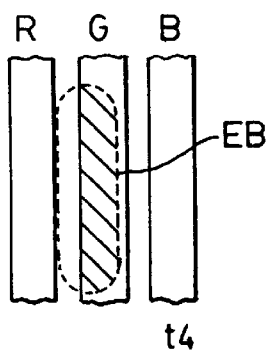
Figure 2:
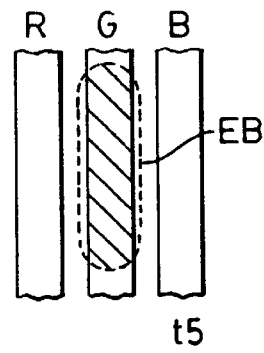

During testing of electronic display devices, it is desired to measure beam landing errors so that adjustments can be made to the electronic display devices to compensate for these beam landing errors. An embodiment of the present method of measuring beam landing errors within an electronic display device in the form of a color picture tube will now be described with particular reference to FIGS. 2 and 3. For ease of understanding, the method will be described with reference to the electron beam impinging on a single green phosphor stripe. It will be appreciated that the method can be performed for electron beams impinging on other color phosphor stripes and at various locations on the phosphor screen.

In the present method, a sensor having a wobulator therein is placed in front of the color picture tube. The sensor is preferably of the type manufactured by Image Processing Systems Inc. of Toronto, Ontario under model number ADI5200. The wobulator in the sensor generates magnetic fields which alternate in polarity each half-cycle. Initially, the magnitude of the magnetic fields to be generated by the wobulator is set to the desired level and the wobulator is actuated. The wobulator in turn generates a positive magnetic field W1 during its first half-cycle at time t1 to deflect the electron beam EB from its normal position shown in FIG. 1 to the right. The intensity I1 of the illuminated green phosphor stripe is then measured by the sensor in a known manner using either a filtered photodiode or a color CCD imaging sensor. The measured intensity I1 is stored in computer memory. The intensity measurement is made in a measurement area of the color picture tube corresponding to the field of view of the sensor covering many phosphor stripes thereby averaging any local variations in phosphor stripe geometry.

Following this, the wobulator generates a negative field W2 of the same magnitude during its second half-cycle at time t2 to deflect the electron beam from its normal position to the left. The intensity I2 of the illuminated green phosphor stripe is again measured and the measured intensity I2 is stored in computer memory.

Thereafter, the magnitude of the magnetic field to be generated by the wobulator is changed and set to a different desired level. The wobulator is then actuated and generates a positive magnetic field W3 having a magnitude less than the magnitude of magnetic fields W1 and W2 during its first half-cycle at time t3 to deflect the electron beam EB from its normal position to the right. Again, the intensity I3 of the illuminated green phosphor stripe is measured and the measured intensity I3 is stored in computer memory. Following this, the wobulator generates a negative magnetic field W4 of the same magnitude during its second half-cycle at time t4 to deflect the electron beam from its normal position to the left. The intensity I4 of the illuminated green phosphor stripe is measured and stored in computer memory.

Figure 3:
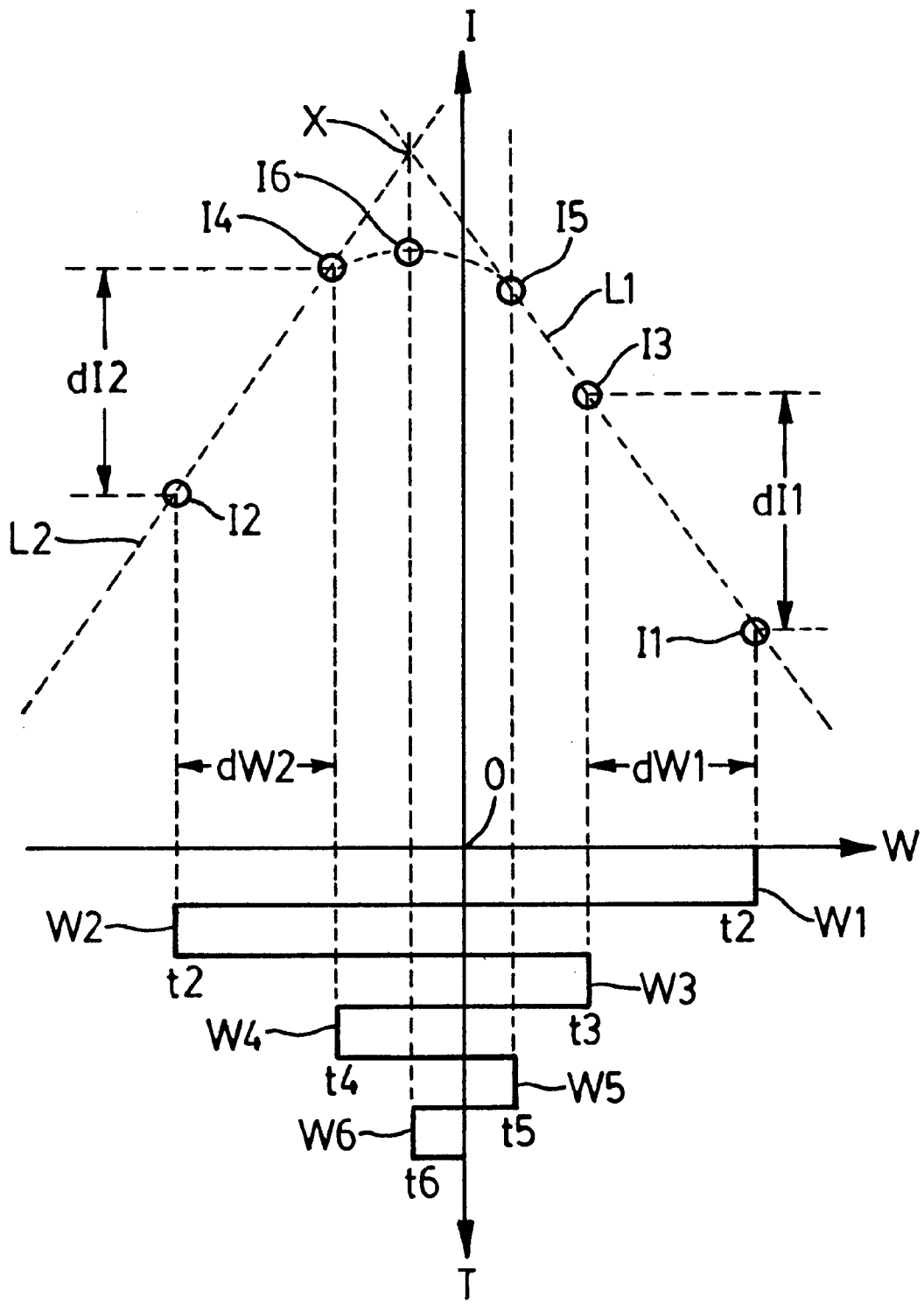
FIG. 3 is a graph showing the relationship of the effect of the magnetic fields applied to the electron beam of FIG. 2 and the measured light intensities of the illuminated phosphor stripe.

Once the intensities of the illuminated phosphor stripe have been measured and stored resulting from electron beams influenced by at least two different magnitude magnetic fields of each polarity, the intensities are plotted and mathematical operations are performed using a computer to approximate the measured intensities resulting from electron beams influenced by each polarity magnetic field with straight lines L1 and L2. For ease of understanding, a straight line approximation is shown in FIG. 3 since only two light intensity measurements resulting from electron beams influenced by each polarity magnetic field are taken. However, those of skill in the art will appreciated that higher order function such as hyperbolae can be used to approximate the measured intensities and their asymptotes used as the straight line approximations if three or more light intensity measurements resulting from electron beams influenced by each polarity magnetic field are taken.

After the straight line approximations have been determined, the intersection point X of the straight lines L1 and L2 is calculated and the corresponding magnetic field W6 associated with the intersection point X is determined. Magnetic field W6 is the magnetic field required to deflect the electron beam EB to achieve ideal beam landing on the green phosphor stripe.

Once the magnetic field W6 is known, the wobulator is actuated to generate a magnetic field having a magnitude equal to the magnitude of calculated magnetic field W6. During the first half-cycle, the wobulator generates a positive magnetic field W5 at time t5 to deflect the electron beam to the right. The intensity I5 of the illuminated green phosphor stripe is measured and stored in computer memory although the measured intensity I5 and corresponding magnetic field W5 are not used. During the second half-cycle, the wobulator generates the negative magnetic field W6 at time t6 to deflect the electron beam EB to its ideal position with respect to the green phosphor stripe and the intensity I6 of the illuminated green phosphor stripe is measured and stored in computer memory. This measured intensity I6 represents the maximum intensity (i.e. 100%). Once the intensity I6 is known, it can be used to normalize the previously measured and stored intensities I1 to I4. For example, normalized intensity I1' can be calculated as follows:

$$I1'=(I1/I6) * 100 \qquad (1)$$

Assuming a proportional relationship between the relative horizontal positive of the electron beam and the corresponding phosphor stripe, it can be seen that the light intensity relative to the maximum intensity at the ideal beam position is proportional to the width of the electron beam EB overlapping onto the width PW of the phosphor stripe. This assumption is valid with reasonable accuracy for any typical color picture tube having a striped phosphor screen and slotted shadow mask.

Knowing the differences dW1 and dW2 between the magnetic fields W1–W3 and W2–W4 respectively, the differences dI1' and dI2' between the normalized light intensities at the corresponding magnetic fields, the magnetic field W6 required to achieve ideal beam positioning, as well as the width PW of the phosphor stripe, the following expression can be used to calculate the beam landing error in the dimension of the phosphor stripe width PW:

$$BeamLandingError = \frac{(dI1' + dI2')/2}{(dW1 + dW2)/2} * W6 * PW \qquad (2)$$

In the above expression, the average of the normalized intensity differences dI1' and dI2', as well as the average of the magnetic field differences dW1 and dW2 are utilized for improving the stability of the beam landing error measurement.

The magnitudes of the magnetic fields generates by the wobulator can be set to arbitrary values to suit the color picture tubes under test. It is however desired that the absolute value of the positive magnetic fields generated by the wobulator is equal to the absolute value of the negative magnetic fields. Also, it is desired that the magnetic fields generated by the wobulator are timed such that the they are generated at times equal to or a multiple of the vertical scan time of the color picture tube.

Although the above method shows alternating polarity magnetic fields being generated at times t1 to t4 prior to calculating magnetic field W6, it will be appreciated by those of skill in the art that the number of magnetic fields of each polarity generated and for which corresponding light intensities are measured is arbitrary and additional magnetic fields can be generated if desired.

Figure 4:
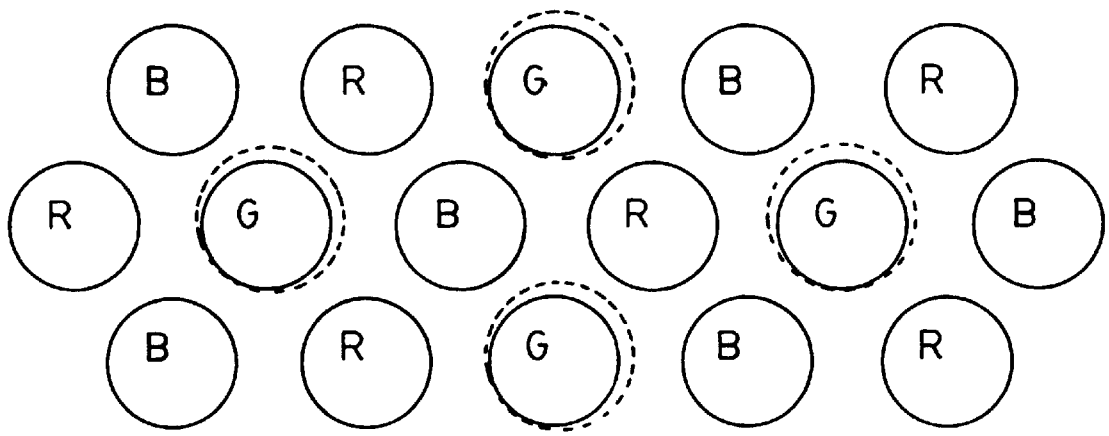
FIG. 4 is an illumination of a portion of a phosphor dot matrix within a color display tube showing electron beams impinging on green phosphor dots without being influenced by a magnetic field.
Figure 5:
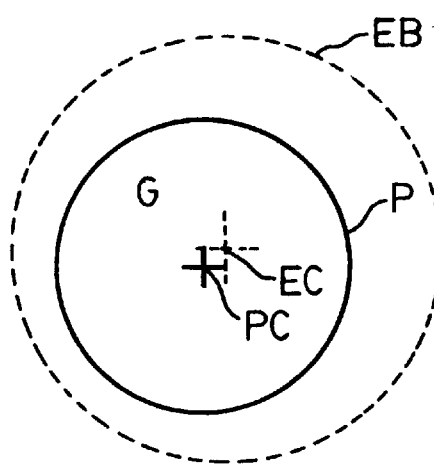
FIG. 5 is an enlarged illustration of a portion of FIG. 4 showing the electron beam impinging on the green phosphor dot.

A similar method can also be utilized for measuring beam landing errors in color display tubes having phosphor elements arranged as a dot matrix. Referring now to FIG. 4, a portion of the phosphor dot matrix forming part of a phosphor screen within a color display tube is shown. In FIG. 5, an electron beam EB is shown impinging on a single green phosphor dot P in a horizontally and vertically misaligned position (i.e. the center EC of the electron beam EB is offset with respect to the center PC of the phosphor dot P). When using the method of the present invention to measure beam landing errors in a color display tube of this nature, the steps described above are first used to find the horizontal ideal position of the electron beam relative to the phosphor dot and its corresponding horizontal magnetic field. The horizontal magnetic field needed to deflect the electron beam to its horizontal ideal position is maintained at a constant value and the steps of the above-described method are performed again along a vertical axis to determine the vertical ideal position of the electron beam relative to the phosphor dot as well as its corresponding vertical magnetic field. The vertical beam landing error is then calculated using the vertical magnetic field and the vertical dimension of the phosphor dot.

After this, the vertical magnetic field needed to deflect the electron beam to its vertical ideal position is maintained at a constant value and the above-described steps are performed along a horizontal axis. The horizontal beam landing error is then calculated using the horizontal magnetic field and the horizontal dimension of the phosphor dot. It will be appreciated that the order of the vertical and horizontal beam landing measurements may be reversed.

Since the relationship between the measured light intensity and the relative position of the phosphor dots and electron beams is non-linear, a look-up table is utilized to linearize the measurement results by mathematically calculating the linearization of the common area of two intersecting circles.

As will be appreciated, the present invention provides a simple method of measuring beam landing errors within electronic display devices which does not require microscopic images of illuminated phosphor elements to be examined or large magnetic fields to be generated. Those of skill in the art will also appreciate that variations and modifications may be made to the present invention without departing from the spirit and scope thereof as defined by the appended claims.

We claim:

1. A method of calculating beam landing errors in an electronic display device having color phosphor elements, and electron guns to generate electron beams to impinge on corresponding phosphor elements, said method comprising the steps of:

(i) generating a magnetic field having a first magnitude to deflect an electron beam relative to the corresponding phosphor element on which said electron beam is to impinge and measuring the intensity of light emitted by said phosphor element as said electron beam impinges thereon;

(ii) reversing the polarity of said magnetic field and repeating step (i) thereby to measure at least two different light intensities influenced by each polarity magnetic field of said first magnitude;

(iii) changing the magnitude of the magnetic field to a second magnitude and repeating steps (i) and (ii) thereby to measure at least two different light intensities influenced by each polarity magnetic field of said second magnitude;

(iv) approximating the at least two different light intensities influenced by the magnetic fields of said first magnitude with a first straight line and approximating the at least two different light intensities influenced by the magnetic fields of said second magnitude with a second straight line and determining an intersection point of said first straight line and said second straight line;

(v) generating a magnetic field having a magnitude corresponding to said intersection point and measuring the intensity of light emitted by said phosphor element as said electron beam impinges thereon; and (vi) calculating a beam landing error using a characteristic of said phosphor element and at least some of said measured light intensities and corresponding magnetic field magnitudes.

2. The method of claim 1 wherein said characteristic is a dimension of said phosphor element.

3. The method of claim 2 wherein said beam landing error is calculated using the formula:

$$BeamLandingError = \frac{(dI1' + dI2')/2}{(dW1 + dW2)/2} * W6 * PW$$

where:

dI1' and dI2' are differences between normalized light intensities measured at step (i);

dW1 and dW2 are differences between the magnitudes of the magnetic fields corresponding to the light intensities measured at step (i);

W6 is the magnetic field corresponding to the intersection point of said first straight line and said second straight line; and PW is the dimension of said phosphor element in the direction of deflection of said electron beam.

4. The method of claim 1 wherein at step (iii) the magnitude of said magnetic field is decreased.

5. The method of claim 3 wherein steps (i) to (iii) are performed three or more times.

6. The method of claim 5 wherein said light intensities are approximated using a higher order function and wherein said first straight line and said second straight line are determined from said high order function.

7. The method of claim 6 wherein said higher order function is a hyperbola and wherein said first straight line and said second straight line are determined by the asymptote thereof.

8. The method of claim 1 wherein said straight lines are determined using a straight line approximation.

9. A method of calculating beam landing errors in a color picture tube having a phosphor screen including a plurality of spaced, red, green and blue phosphor stripes, electron guns to generate red, green and blue electron beams to impinge on corresponding phosphor stripes and a shadow mask interposed between said electron guns and said phosphor screen, said method comprising the steps of:

(i) generating a magnetic field having a first magnitude to deflect an electron beam relative to the corresponding phosphor stripe on which said electron beam is to impinge and measuring the intensity of light emitted by said phosphor stripe as said electron beam impinges thereon;

(ii) reversing the polarity of said magnetic field and repeating step (i) thereby to measure at least two different light intensities influenced by each polarity magnetic field of said first magnitude;

(iii) changing the magnitude of the magnetic field to a second magnitude and repeating steps (i) and (ii) thereby to measure at least two different light intensities influenced by each polarity magnetic field of said second magnitude;

(iv) approximating each of said at least two different light intensities influenced by the magnetic fields of said first magnitude with a first straight line and approximating the at least two different light intensities influenced by the magnetic fields of said second magnitude with a second straight line and determining an intersection point of said first straight line and said second straight line;

(v) generating a magnetic field having a magnitude corresponding to said intersection point and measuring the intensity of light emitted by said phosphor stripe as said electron beam impinges thereon; and (vi) calculating a beam landing error using the width of said phosphor stripe and at least some of said measured light intensities and corresponding magnetic field magnitudes.

10. The method of claim 9 wherein said beam landing error is calculated using the formula:

$$BeamLandingError = \frac{(dI1' + dI2')/2}{(dW1 + dW2)/2} * W6 * PW$$

where:

dI1' and dI2' are differences between normalized light intensities measured at step (i);

dW1 and dW2 are differences between the magnetic fields corresponding to the light intensities measured at step (i);

W6 is the magnetic field corresponding to the intersection point of said first straight line and said second straight line; and PW is the width of said phosphor stripe.

11. The method of claim 9 wherein steps (i) to (iii) are performed three or more times.

12. The method of claim 11 wherein said light intensities are approximated using a higher order function and wherein said first straight line and said second straight line are determined from said high order function.

13. The method of claim 12 wherein said higher order function is a hyperbola and wherein said first straight line and said straight line are determined by the asymptote thereof.

14. The method of claim 9 wherein said straight lines are determined using a straight line approximation.

15. A method of calculating beam landing errors in a color display tube having a phosphor screen including a matrix of red, green and blue phosphor dots, electron guns to generate red, green and blue electron beams to impinge on corresponding phosphor dots, said method comprising the steps of:

(i) generating a magnetic field having a first magnitude to deflect the electron beam relative to the corresponding phosphor dot on which said electron beam is to impinge in one of a horizontal and vertical direction and measuring the intensity of the light emitted by said phosphor dot as said electron beam impinges thereon;

(ii) reversing the polarity of said magnetic field and repeating step (i) thereby to measure at least two different light intensities influenced by each polarity magnetic field of said first magnitude;

(iii) changing the magnitude of the magnetic field to a second magnitude and repeating steps (i) and (ii) thereby to measure at least two different light intensities influenced by each polarity magnetic field of said second magnitude;

(iv) approximating the at least two different light intensities by the magnetic fields of said first magnitude with a first straight line and approximating the at least two different light intensities influenced by the magnetic fields of said second magnitude with a second straight line and determining an intersection point of said first straight line and said second straight line and a magnetic field magnitude corresponding to said intersection point;

(v) maintaining the magnetic field magnitude determined at step (iv) and repeating steps (i) to (iv) with said electron beam being deflected in the other of the horizontal and vertical direction;

(vi) generating said magnetic field corresponding to said intersection point with said magnetic field being maintained and measuring the intensity of light emitted by said phosphor dot as said electron beam impinges thereon;

(vii) calculating a beam landing error for said other of the horizontal and vertical direction using a dimension of said phosphor dot and at least some of said measured light intensities and corresponding magnetic field magnitudes; and (viii) repeating steps (v) to (vii) with the magnetic field being maintained as determined at step (v) thereby to calculate the beam landing error for said one of the horizontal and vertical direction.

16. The method of claim 15 wherein said measured light intensities are linearized using values taken from a look-up table to linearize the common area of intersecting circles.

17. A method of calculating beam landing errors in an electronic display device having color phosphor elements, and electron guns to generate electron beams to impinge on corresponding phosphor elements, said method comprising the steps of:

(i) generating a magnetic field having a first magnitude to deflect an electron beam relative to the corresponding phosphor element on which said electron beam is to impinge and measuring the intensity of light emitted by said phosphor element as said electron beam impinges thereon;

(ii) reversing the polarity of said magnetic field and repeating step (i) thereby to measure at least two different light intensities influenced by each polarity magnetic field of said first magnitude;

(iii) generating a magnetic field having a second magnitude different from said first magnitude to deflect an electron beam relative to the corresponding phosphor element on which said electron beam is to impinge and measuring the intensity of light emitted by said phosphor element as said electron beam impinges thereon;

(iv) reversing the polarity of said magnetic field and repeating steps (iii) thereby to measure at least two different light intensities influenced by each polarity magnetic field of said second magnitude;

(v) calculating a first straight line approximating the light intensities measured at step (i) and a second straight line approximating the light intensities measured at step (iii), said first straight line and second straight line intersecting one another;

(v) determining an intersection point of said first straight line and said second straight line and a magnetic field magnitude corresponding to the intersection point;

(vii) generating a magnetic field having a magnitude corresponding to the intersection point and measuring the intensity of light emitted by said phosphor element as said electron beam impinges thereon; and (viii) calculating a beam landing error using a characteristic of said phosphor element and at least some of said measured light intensities and corresponding magnetic field magnitudes.

18. The method of claim 17 wherein said characteristic is a dimension of said phosphor element.

19. The method of claim 18 wherein said beam landing error is calculated using the formula:

$$BeamLandingError = \frac{(dI1' + dI2')/2}{(dW1 + dW2)/2} * W6 * PW$$

where:

dI1' and dI2' are differences between normalized light intensities measured at step (i);

dW1 and dW2 are differences between the magnitudes of the magnetic fields corresponding to the light intensities measured at step (i);

W6 is the magnetic field corresponding to the intersection point of said first straight line and said second straight line; and PW is the dimension of said phosphor element in the direction of deflection of said electron beam.

20. A method of calculating beam landing errors in a color picture tube having a phosphor screen including a plurality of spaced, red, green and blue phosphor stripes, electron guns to generate red, green and blue electron beams to impinge on corresponding phosphor stripes and a shadow mask interposed between said electron guns and said phosphor screen, said method comprising the steps of:

(i) generating a magnetic field having a first magnitude to deflect an electron beam relative to the corresponding phosphor stripe on which said electron beam is to impinge and measuring the intensity of light emitted by said phosphor stripe as said electron beam impinges thereon;

(ii) reversing the polarity of said magnetic field and repeating step (i) thereby to measure at least two different light intensities influenced by each polarity magnetic field of said first magnitude;

(iii) generating a magnetic field having a second magnitude different from said first magnitude to deflect an electron beam relative to the corresponding phosphor stripe on which said electron beam is to impinge and measuring the intensity of light emitted by said phosphor stripe as said electron beam impinges thereon;

(iv) reversing the polarity of said magnetic field and repeating step (iii) thereby to measure at least two different light intensities influenced by each polarity magnetic field of said second magnitude;

(v) calculating a first straight line approximating the light intensities measured at step (i) and a second straight line approximating the light intensities measured at step (iii), said first straight line and second straight line intersecting one another;

(vi) determining an intersection point of said first straight line and said second straight line and a magnetic field magnitude corresponding to the intersection point;

(vii) generating a magnetic field having a magnitude corresponding to the intersection point and measuring the intensity of light emitted by said phosphor stripe as said electron beam impinges thereon; and (viii) calculating a beam landing error using a characteristic of said phosphor stripe and at least some of said measured light intensities and corresponding magnetic field magnitudes.

21. The method of claim 20 wherein said first straight line and said second straight line are determined using a straight line approximation.

22. The method of claim 20 wherein said light intensities are approximated using a higher order function and wherein said first straight line and said second straight line are determined from said high order function.

23. The method of claim 22 wherein said higher order function is a hyperbola and wherein said first straight line and said second straight line are determined by the asymptote thereof.

24. A method of calculating beam landing errors in a color picture tube having a phosphor screen including a plurality of spaced, red, green and blue phosphor stripes, electron guns to generate red, green and blue electron beams to impinge on corresponding phosphor stripes and a shadow mask interposed between said electron guns and said phosphor screen, said method comprising the steps of:

(i) generating a magnetic field having a first magnitude to deflect an electron beam relative to the corresponding phosphor stripe on which said electron beam is to impinge and measuring the intensity of light emitted by said phosphor stripe as said electron beam impinges thereon;

(ii) reversing the polarity of said magnetic field and repeating step (i) thereby to measure at least two different light intensities influenced by each polarity magnetic field of said first magnitude;

(iii) generating a magnetic field having a second magnitude different from said first magnitude to deflect an electron beam relative to the corresponding phosphor stripe on which said electron beam is to impinge and measuring the intensity of light emitted by said phosphor stripe as said electron beam impinges thereon;

(iv) reversing the polarity of said magnetic field and repeating step (iii) thereby to measure at least two different light intensities influenced by each polarity magnetic field of said second magnitude;

(v) calculating a first straight line approximating the light intensities measured at step (i) and a second straight line approximating the light intensities measured at step (iii), said first straight line and second straight line intersecting one another;

(vi) determining an intersection point of said first straight line and said second straight line and a magnetic field magnitude corresponding to the intersection point;

(vii) generating a magnetic field having a magnitude corresponding to the intersection point and measuring the intensity of light emitted by said phosphor stripe as said electron beam impinges thereon; and (viii) calculating a beam landing error using the formula:

$$BeamLandingError = \frac{(dI1' + dI2')/2}{(dW1 + dW2)/2} * W6 * PW$$

where:

dI1' and dI2' are differences between normalized light intensities measured at step (i);

dW1 and dW2 are differences between the magnetic fields corresponding to the light intensities measured at step (i);

W6 is the magnetic field corresponding to the intersection point of said first straight line and said second straight line; and PW is the width of said phosphor stripe.

25. The method of claim 24 wherein steps (i) to (iii) are performed three or more times.

26. The method of claim 24 wherein said first straight line and said second straight line are determined using a straight line approximation.

27. The method of claim 24 wherein said intensities are approximated using a higher order function and wherein said first straight line and said second straight line are determined from said higher order function.

28. The method of claim 27 wherein said higher order function is a hyperbola and wherein said first straight line and said second straight line are determined by the asymptote thereof.

* * * * *

UNITED STATES PATENT AND TRADEMARK OFFICE
CERTIFICATE OF CORRECTION

PATENT NO.   : 6,097,355
DATED        : August 1, 2000
INVENTOR(S)  : Wayne G. Dawe et al.

Page 1 of 1

It is certified that error appears in the above-identified patent and that said Letters Patent is hereby corrected as shown below:

Column 9, claim 5,
Line 26, "claim 3" should read -- claim 4 --.

Column 10, claim 13,
Line 34, insert -- second -- before "straight".

Column 11, claim 17,
Line 44, "steps" should read -- step --.
Line 55, please insert after "point;" -- (vi) determining an intersection point of said first straight line and said second straight line and a magnetic field magnitude corresponding to the intersection point; --.

Column 14, claim 27,
Line 28, "claim 24" should read -- claim 25 --.

Signed and Sealed this

Twenty-fifth Day of December, 2001

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,097,355
DATED        : August 1, 2000
INVENTOR(S)  : Wayne G. Dawe et al.

It is certified that error appears in the above-identified patent and that said Letters Patent is hereby corrected as shown below:

Title page,
ABSTRACT,
Line 13, "beam" should read -- beams --.

Column 1,
Line 13, "complex" should read -- computer --.
Line 63, "rods" should read -- ends --.

Column 3,
Line 14, "dimension" should read -- direction --.

Column 5,
Line 12, "illlumination" should read -- illustration --.

Column 6,
Line 46, "function" should read -- functions --.

Column 7,
Line 14, "positive" should read -- position --.
Line 40, "generates" should read -- generated --.
Line 60, "color" should read -- colored --.

Column 9, claim 5,
Line 26, "claim 3" should read -- claim 4 --.

Column 10, claim 13,
Line 34, insert -- second -- before "straight".

UNITED STATES PATENT AND TRADEMARK OFFICE
CERTIFICATE OF CORRECTION

PATENT NO.     : 6,097,355
DATED          : August 1, 2000
INVENTOR(S)    : Wayne G. Dawe et al.

It is certified that error appears in the above-identified patent and that said Letters Patent is hereby corrected as shown below:

<u>Column 11, claim 17,</u>
Line 44, "steps" should read -- step --.
Line 55, please insert after "point;" -- (vi) determining an intersection point of said first straight line and said second straight line and a magnetic field magnitude corresponding to the intersection point; --.

<u>Column 14, claim 27,</u>
Line 28, "claim 24" should read -- claim 25 --.

Signed and Sealed this

Fifteenth Day of January, 2002

Attest:

JAMES E. ROGAN
*Attesting Officer*      *Director of the United States Patent and Trademark Office*